Jan. 28, 1964  A. J. DESROSIERS  3,119,955
VARIABLE WOUND FILM CAPACITORS
Filed April 14, 1958

INVENTOR
ALBERT J. DESROSIERS
BY Connolly and Hutz
ATTORNEYS

United States Patent Office 3,119,955
Patented Jan. 28, 1964

3,119,955
VARIABLE WOUND FILM CAPACITORS
Albert Joseph Desrosiers, Pittsfield, Mass., assignor to Sprague Electric Company, North Adams, Mass., a corporation of Massachusetts
Filed Apr. 14, 1958, Ser. No. 728,160
3 Claims. (Cl. 317—249)

This invention relates to capacitors having an adjustable capacitance, and more particularly to adjustable capacitors in which the thickness of layers of dielectric may be varied.

Adjustable capacitors are valuable components for precise tuning. Previously known adjustable capacitors have contained various types of means of variation. One of the types of adjustable capacitors is a capacitance section in which layers of a solid dielectric space apart conductive foils. The capacity of the dielectric spacers is varied by a variation of the compactness of the interleaved foils and dielectric spacers. This variation is dependent upon variation of pressure on the section of foils and dielectric spacers to cause a variation in the volume of air in the space between the foils, and thus vary the capacitance of the section. The degree of capacity variation possible by varying the dielectric thickness with pressure has been limited to a very small capacity change.

The variation of capacity by pressure has been limited generally to structures in which interleaved foils and dielectrics are arranged in a flat section and subjected to a variable pressure from a pressure plate. This structure has been positioned in a bathtub type of container wherein the change in capacity has been obtained by a set screw which varies the pressure applied through the pressure plate. This structure has undesirable features which include the shape of the container, a limitation to a small percentage of capacity change, and a deleterious effect on the capacitor section.

It is an object of this invention to provide a variable capacitor having a capacity variable over a substantial percentage range by pressure applied on an active section of the capacitor.

It is another object of this invention to provide a capacitor with improved variable capacitance characteristics in a structure of reduced size.

Still another object of this invention is to provide a capacitor variable under pressure which does apply pressure at a fold of capacitor components.

It is still another object of this invention to provide a capacitor of variable capacity under pressure which is easy to manufacture and has a rugged structure.

These and other objects of this invention will become more apparent upon consideration of the following description taken together with the accompanying drawings, in which.

In the device of this invention a rolled capacitance section is flattened and formed into a horseshoe shape and inserted into a can or case. The can also contains a pressure tube which fits into the bight of the horseshoe shaped section and under the influence of a set screw variably presses the section against the inner surface of the can.

Figure 1:
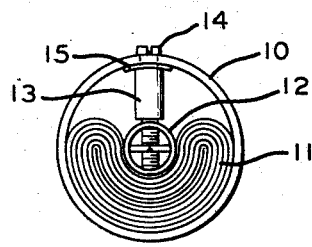
FIGURE 1 is a radial section of a capacitor according to this invention.
Figure 2:
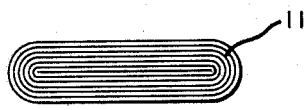
FIGURE 2 is a cross section of the capacitance section of the capacitor of this invention.

Referring specifically to the figures, a can 10 contains a capacitance section 11, a pressure tube 12 and a compression shaft 13. The section 11 is an uncured section and thus retains resiliency under compression. The compression shaft 13 is moved by a set screw 14 threaded in a plate 15 mounted on the inner surface of the can 10 at an upper sector as seen in FIGURE 1. The section 11 is made up of convolutely wound laminations as shown in FIGURE 2, wherein section 11 is shown in its preliminary rolled and flattened shape preparatory to formation into a horseshoe shape for insertion in the can 10. The laminations are shown diagrammatically in the figures and are composed of layers of foil which form the capacitor electrodes and layers of dielectric material which space the foil apart and provide the section with capacity.

Figure 3:
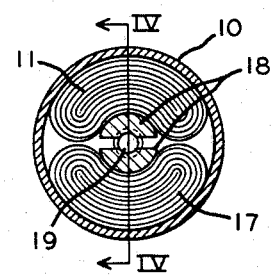
FIGURE 3 is a radial section of a capacitor incorporating two capacitive sections in a preferred embodiment of this invention.

In FIGURE 3 a capacitor according to this invention is shown made up of a can 10 containing two capacitive sections. Capacitance section 11 corresponds to the section 11 described in FIGURE 1 and is uncured and retains a resiliency under compression. Another section 17 is a convolutely wound section which after having been formed into a horseshoe shape of a size to fit into the can 10 is cured. Curing of the section 17 causes it to lose its resiliency and compressibility. An expandable and contractible mandrel 18 is positioned between the sections 11 and 17.

The nature of mandrel 18 is such as to allow a variation and adjustment of the diameter of the mandrel which results in the expansion and contraction, and accordingly a radial variation in the space that is occupied by the mandrel within the can 10. The expansion or contraction of the diameter or part of the diameter of the mandrel 18 results in the application or the release of pressure on the sections 11 and 17 with a consequent compression or expansion of the resilient section 11. Upon compression of the laminations of section 11 the capacity of the section 11 is varied. Upon release of the compression on the section 11 the resiliency of the section causes expansion which in turn results in a change in the capacity of section 11. Accordingly the capacitance of the FIGURE 3 capacitor is varied and adjustable.

The expandable mandrel 18 illustrated is one form of possible expandable mandrels. In this preferred embodiment the mandrel 18 is made up of two separate parts, an upper half and a lower half. The expandable halves of the mandrel have a wedge 19 inserted between them. The wedge 19 is movable axially of the can 10 and is mounted on a set screw 20 which threading through a nut 21 causes the wedge 19 to move axially of the can 16. The nut 21 is set into the can 10. By the turning of the screw 20 in the nut 21 the wedge 19 is forced between or withdrawn from insertion by the separate halves of the mandrel 18. By the variation of the position of wedge 19 in the mandrel 18, the pressure of the mandrel halves on the sections 11 and 17 is varied and is adjustable. The mandrel 18 halves are urged together by the resiliency of section 11 so that upon the retraction of the wedge 19 from between the halves of the mandrel they are automatically forced together.

Figure 4:
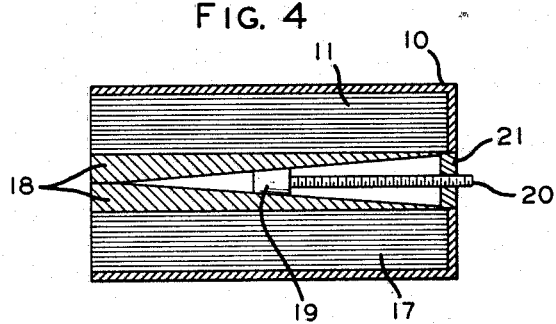
FIGURE 4 is an axial section of the capacitor of FIGURE 3 taken on line IV—IV of FIGURE 3 in the direction of the arrows.

In the operation of the embodiment shown in FIGURE 1, the variation of the pressure exerted by tube 12 on the capacitor section 11 is affected similarly to the pressure on the section 11 as described in connection with the embodiment of FIGURES 3 and 4. In the capacitor of FIGURE 1 the pressure tube 12 is mounted on the compression shaft 13. Screw 14 can be turned to urge or withdraw the pressure tube 12 from contact with section 11. Upon screwing the set screw 14 into the plate 15, the pressure tube 12 is forced against section 11.

Conversely, on threading of the screw 14 out of the can 10, the pressure tube 12 moves out from the section 11 to relieve the compressive force. On the removal of the pressure tube 12 from the section 11, the resiliency of the uncured section 11 responds to the relaxation of the compressed laminations and the section 11 expands to change its capacity.

In the operation of this invention the compression of the capacitance section affects the thickness of the air layers contained within the section. Upon compression of the section the air layers are thinned and reduced to a significant degree. This production of thinness of the air layers changes the dielectric value of the capacitance section and accordingly the capacity of the section. This in turn is reflected by the change in the capacity of the capacitor as a whole unit.

Various modifications of the structures set forth in the above-described embodiments may be made in the device of this invention without a departure from the spirit thereof. For example, in the preferred embodiment of FIGURES 3 and 4 the expandable mandrel 18 may be composed of a compressible rubber bung in which the central portion of the mandrel is subject to expansion and contraction by compression applied through suitable adjustable means at the axial ends of the mandrel. It will also be apparent that while the embodiment of FIGURES 3 and 4 has been classed as a cured and an uncured capacitance section it will be possible within the concept of this invention to compose a capacitor of two uncured sections and obtain an adjustability of the capacity of such a capacitor.

In a further possible modification of this invention, additional capacitive sections may be included in the capacitor. Additional lobes of the capacitor can each contain a capacitive section under the influence of a compressing member which bears against the sections from a common center. One form of stacked capacitors of this combination can be characterized by a multiple figure 3 type of radial configuration.

The laminations of the capacitance sections might be made up of any suitable foil materials for the electrodes and dielectric sheets for the dielectric spacers. One dielectric material that has been found particularly suited to this invention is polystyrene in suitably thin layers. Similarly polyethyleneterephthalate films are adaptable to the formation of dielectric spacers in a capacitance section according to this invention. Sections incorporating polyethyleneterephthalate films or polyethyleneterephthalate-polystyrene complex films exhibit superior temperature coefficient, and a characteristic stability through certain limited temperature ranges. A dielectric of polystyrene films possesses a straight line temperature coefficient and is advantageous in its predictability.

The capacitor construction of this invention provides an adjustability of capacitance over a greater range of capacitance than heretofore obtainable. Also the inventive article is compact and readily adaptable to routine assembly procedures. Other advantages of the device of this invention include the application of the variable pressure at a structurally strong point in the capacitance section. As shown in FIGURES 1 and 3, varying the small-area axial pressure in the bight of the horseshoe-shaped capacitance section does not apply pressure against the ends of the flattened section; hence, does not force the ends into crushing contact with the wall of the capacitor casing where irreparable damage would be done. This in turn is reflected in a longer life expectancy and a smaller danger of breakdown of the resultant component.

This invention provides for the adjustability in a wound capacitive section with a minimum compression on folded portions of the layers of the section. Further this invention provides a small capacitor in which the capacity is adjustable by pressure. It will be readily understood that the above-described embodiments are set forth for the purpose of illustration only, and it is intended that the invention be limited solely by the scope of the appended claims.

What is claimed is:

1. A variable capacitor comprising a cylindrical container, a convolutely wound capacitance section within said container, said section having an uncured plastic film dielectric, said section being flattened and formed axially into a horseshoe shape to provide an outer curved surface conforming to said container, a curved pressure member mounted in said container with its axis parallel to the axis of said container, said member providing a small area contact with the bight portion of said horseshoe shaped section, and adjustable means structurally associated with said pressure member to vary the compressional contact of said member on said section.

2. A capacitor as defined in claim 1 wherein said curved pressure member is an expansible mandrel, and said adjustable means includes a rod capable of expanding said mandrel.

3. A variable capacitor comprising a cylindrical container, a plurality of convolutely wound capacitance sections within said container, at least one of said sections being compressible, said compressible section having an uncured plastic film dielectric, said plurality of sections being flattened and horseshoe shaped axially to conform to the inner surface of said cylindrical container, a pressure member centrally positioned in said container between said sections with its axis parallel to the axis of said container, a curved surface of said pressure member in small area contact with the bight portion of said sections and capable of applying pressure to said compressible section, and means for varying the pressure of said pressure member on said compressible section.

References Cited in the file of this patent

UNITED STATES PATENTS

| 1,611,990 | Bonine | Dec. 28, 1926 |
| 2,641,647 | Wallin | June 9, 1953 |
| 2,755,796 | Boucke | July 24, 1956 |
| 2,799,816 | Schwartz | July 16, 1957 |

FOREIGN PATENTS

| 547,123 | Germany | Mar. 10, 1932 |
| 892,324 | Germany | Oct. 5, 1953 |